US 8,448,328 B2

(12) United States Patent
Wang

(10) Patent No.: US 8,448,328 B2
(45) Date of Patent: May 28, 2013

(54) METHODS OF MAKING ALUMINUM BASED COMPOSITE SQUIRREL CAGE FOR INDUCTION ROTOR

(75) Inventor: Yucong Wang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 12/652,911

(22) Filed: Jan. 6, 2010

(65) Prior Publication Data
US 2011/0163627 A1 Jul. 7, 2011

(51) Int. Cl.
*H02K 15/02* (2006.01)
*H02K 15/10* (2006.01)

(52) U.S. Cl.
USPC ............................................ 29/598; 29/596

(58) Field of Classification Search
USPC ......... 29/598, 416, 596, 825; 72/256; 310/51, 310/179, 211, 212, 262
See application file for complete search history.

(56) References Cited

U.S. PATENT DOCUMENTS

| | | | |
|---|---|---|---|
| 3,705,971 A | 12/1972 | Jacovides et al. | |
| 5,429,173 A | 7/1995 | Wang et al. | |
| 5,467,521 A | 11/1995 | Nakamura et al. | |
| 5,488,984 A | 2/1996 | Fahy | |
| 5,538,067 A | 7/1996 | Nakamura et al. | |
| 5,736,707 A | 4/1998 | Nied et al. | |
| 5,937,930 A | 8/1999 | Nakamura | |
| 6,088,906 A | 7/2000 | Hsu et al. | |
| 6,453,980 B1 | 9/2002 | Williams | |
| 6,877,210 B2 * | 4/2005 | Hsu ................................. | 29/598 |
| 7,337,525 B2 | 3/2008 | Ueda et al. | |
| 2010/0243197 A1 | 9/2010 | Osborne et al. | |
| 2011/0163627 A1 | 7/2011 | Wang | |
| 2011/0174417 A1 | 7/2011 | Oishi | |
| 2011/0175484 A1 | 7/2011 | Wang | |

FOREIGN PATENT DOCUMENTS

CN 101626179 A 1/2010

OTHER PUBLICATIONS

Xu C.L. et al, Fabrication of Al-CNT composites, 1999, Carbon 37, pp. 855-858.*
Office Action in U.S. Appl. No. 12/691,217, mailed Jun. 7, 2012 (8 pages).
Final Office Action dated Nov. 26, 2012 pertaining to U.S. Appl. No. 12/691,217 filed Jan. 21, 2010.
Advisory Action dated Feb. 7, 2013 pertaining to U.S. Appl. No. 12/691,217 filed Jan. 21, 2010.
Zong-jian, et al., "Dispersion of Carbon Nanotubes in Aqueous Solution with Glycol", Journal of Guangdong University of Technology, vol. 26 No. 2, Jun. 2009, pp. 43-45—Abstract.
Feng Yan, "BN and carbon nanotube reinforced, wear resistant and friction reduced, aluminum based composite material" (Thesis for M.S.), Zhejiang University, Jan. 1, 2004, pp. 1-57—Abstract.

* cited by examiner

*Primary Examiner* — Thiem Phan
(74) *Attorney, Agent, or Firm* — Dinsmore & Shohl LLP

(57) ABSTRACT

A method of making a rotor is provided. The method includes mixing aluminum and carbon nanotubes; forming the mixture into an aluminum-carbon nanotube composite conductor bar; providing a laminated steel stack having a plurality of longitudinal slots; placing a plurality of the conductor bars in the longitudinal slots, first and second ends of the plurality of conductor bars extending out of the longitudinal slots; placing the laminated steel stack with the plurality of conductor bars in a casting mold having cavities for a pair of end rings wherein the first and second ends of the plurality of conductor bars extend into the cavities; and filling the cavities with aluminum, aluminum alloys, an aluminum composite, or combinations thereof. Rotors made from aluminum-carbon nanotube composite are also described.

18 Claims, 2 Drawing Sheets

METHODS OF MAKING ALUMINUM BASED COMPOSITE SQUIRREL CAGE FOR INDUCTION ROTOR

FIELD OF THE INVENTION

This invention relates generally to induction motors, and more particularly to an aluminum composite rotor for an induction motor.

BACKGROUND OF THE INVENTION

Increasing demands in fuel efficiency have made hybrid systems more attractive in the automotive industry. In addition to a conventional combustion engine, an electric machine, which serves as both motor and generator (commonly called electric motor) is an important part of the hybrid system. To reduce manufacturing cost, many of the electric motors used in the hybrid systems are induction motors. Alternating current (AC) induction motors are commonly used in hybrid vehicles because they offer simple, rugged construction, easy maintenance, and cost-effectiveness. The AC induction motor has two basic assemblies: a stator and a rotor. The name "induction motor" comes from the AC "induced" into the rotor via the rotating magnetic flux produced in the stator. An aluminum squirrel cage carries the electrical current, and high electrical conductivity is needed. The lamination steel in the rotor carries magnetic flux. The rotating magnetic field induces electrical current in the squirrel cage. The induced magnetic field in the rotor interacts with the offset magnetic field in the stator, and leads to rotation and the generation of torque. In operation, the rotor speed always lags the magnetic field's speed, allowing the rotor bars to cut the magnetic lines of force and to produce useful torque. This speed difference is called slip speed. Slip increases with load and is necessary for torque production.

The stator structure is typically composed of steel laminations shaped to form poles. Copper wires are formed and inserted as part of the stator assembly. They are connected to a voltage source to produce a rotating magnetic field.

The rotor is typically made of laminations over a steel shaft. The iron core (laminate steel stack) serves to carry the magnetic field across the motor. The structure and materials for the iron core are specifically designed to minimize magnetic losses. The thin laminations (steel sheets), separated by varnish insulation, reduce stray circulating currents that would result in eddy current loss. The material for the laminations typically is a low carbon, high silicon steel specially tailored to produce certain magnetic properties, such as inhibiting eddy currents and narrowing the hysteresis loop of the material (small energy dissipation per cycle, or low core loss) and high permeability (electromagnetism). The low carbon content makes it a magnetically soft material with low hysteresis loss. To reduce the air gap and core loss between the thin laminated steel sheets, it is desired to keep the laminate steel stack as tight as possible. In practice, the laminate steel stack is usually held together using point welding or an interlock mechanism.

Radial slots around the laminations' periphery house rotor bars, which are typically made of aluminum or copper. The rotor bars are often skewed slightly along the length of the rotor to reduce noise and to smooth out torque fluctuations that might result in some speed variations due to interactions with the pole pieces of the stator. The arrangement of the rotor bars resembles a squirrel cage.

Because of its high density and melting point, copper has limitations and/or unique problems in rotor applications, particularly for hybrid systems. In hybrid applications, a high speed (e.g., more than 10,000 rpm) electric motor is usually needed due to space limitations in automotive vehicles. High density copper can produce very high centrifugal force and inertia at high rpm, and may cause performance and durability issues. In addition, rotors are preferably manufactured by high pressure die casting (HPDC). The high melting point of copper (1083° C.) makes the casting process extremely difficult and significantly reduces die life and increases the manufacturing cost of copper rotors.

For the induction motor, an aluminum based squirrel cage is very commonly used because aluminum is much lighter and less expensive than copper. FIG. 1 illustrates a squirrel cage rotor. Although cast aluminum rotors overcome the shortfalls of high rotating inertia and low die life associated with copper material, the mechanical properties impose a great challenge for their successful application in electric motors. The electrical conductivity of aluminum is $37.8 \times 10^6$ $S.M^{-1}$ (at 20° C.), compared with $59.6 \times 10^6$ $S.M^{-1}$ for copper. Pure Aluminum (99.7% purity) has high electrical conductivity (61% of that of pure copper), but low mechanical properties. A6101-T61 (0.6 Mg-0.5 Si) has relatively high electrical conductivity (57%) and improved strength. Both materials are commonly used to make squirrel cages for induction motors. The material's composition, porosity, stress/strain curve, fatigue and creep resistance, and electrical conductivity are very important to the motor's performance and durability. Porosity, commonly seen in casting aluminum, can affect electrical conductivity. The aluminum alloys used for rotor applications are usually wrought alloys which are difficult to cast because their low fluidity, high shrinkage rate (density change from liquid to solid), high melting temperature, and large freezing range (temperature difference between liquidus and solidus), etc. These characteristics of the aluminum wrought alloys increase the porosity and the tendency of hot tearing, particularly for the locations between the conductive bars and the end rings, which lead to fracture of the end rings. Additionally, many cast aluminum rotors are made by high pressure die casting. The entrained air and abundant aluminum oxides produced during the high pressure die casting process, which is due to very high flow velocity (about 60 m/s) in mold filling, can also significantly reduce the thermal and electric conductivity of the rotor, particularly in rotor bars.

Therefore, there is a need for an improved rotor for induction motors and for methods of making them.

SUMMARY OF THE INVENTION

The present invention meets this need by providing improved rotors and methods of making them.

In one embodiment, a method of making a rotor is provided. The method includes mixing aluminum and carbon nanotubes; forming the mixture into an aluminum-carbon nanotube composite conductor bar; providing a laminated steel stack having a plurality of longitudinal slots; placing a plurality of the conductor bars in the longitudinal slots, first and second ends of the plurality of conductor bars extending out of the logitudinal slots; placing the laminated steel stack with the plurality of conductor bars in a casting mold having cavities for a pair of end rings wherein the first and second ends of the plurality of conductor bars extend into the cavities; and filling the cavities with aluminum, aluminum alloys, an aluminum composite, or combinations thereof.

Another aspect is a rotor. The rotor comprises a pair of end rings made of aluminum, or alloys of aluminum, or combinations thereof; and a plurality of conductor bars between the pair of end rings, the pair of end rings and the plurality of conductor bars forming a cylinder, the plurality of conductor bars comprising an aluminum-carbon nanotube composite, wherein the first and second ends of the conductor bars extend into the pair of end rings.

DETAILED DESCRIPTION OF THE INVENTION

An aluminum composite material is used to make the squirrel cage for the rotor application. The aluminum composite cage has high electrical conductivity for high motor performance, high mechanical properties (strength, fatigue and creep resistances) for machine durability and design flexibility, and a lower scrap rate for lower manufacturing cost. Specifically, the cage bars are made of an aluminum matrix/carbon nanotube (CNT) composite, or a combination of the aluminum matrix/carbon nanotube (CNT) composite and pure aluminum (for example, the inner layer is the Al-CNT composite and the outer layer is pure Al). The ends can be made of pure aluminum, cast aluminum alloys, such as A380, A356, A319, etc., or an aluminum composite, including, but not limited to, aluminum carbon nanotubes composites. Cast aluminum alloys are preferred, The whole structure can be manufactured using a cast-in-place process, for example. In the cast-in-place process, the bars are premade and then placed in the casting mold along with steel laminations. This structure takes full advantage of the high electrical and thermal conductivities, high bar strength and end plate strength, and good castability of the cast aluminum alloy in comparison with a traditional single-piece pure aluminum die cast cage manufacturing process. It can also keep the casting defects, including porosity, at a minimum, which is important to high electrical conductivity.

Figure 1:
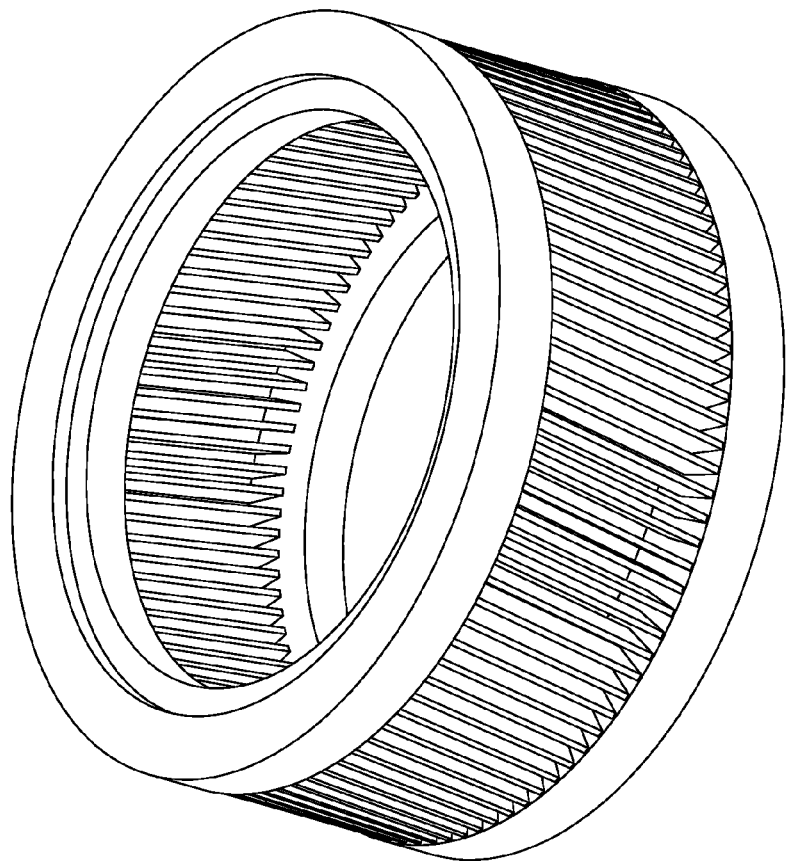
FIG. 1 is an illustration of one embodiment of a squirrel cage rotor.
Figure 2A:
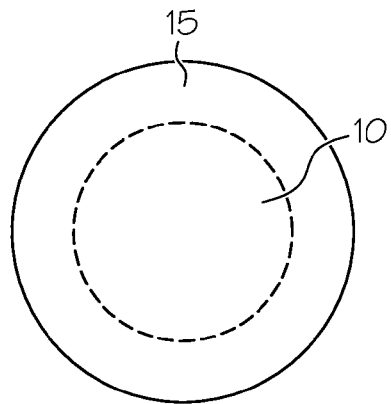
FIGS. 2A-C are illustrations of cross sections of various composite structures for the conductor bars.
Figure 2B:
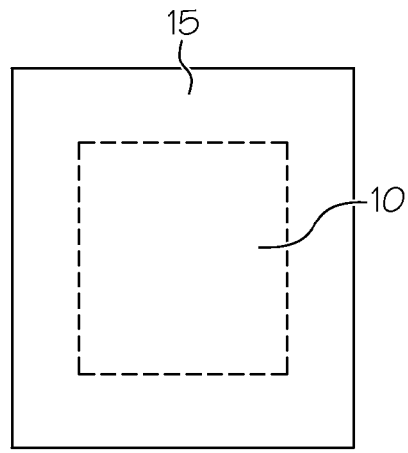
Figure 2C:
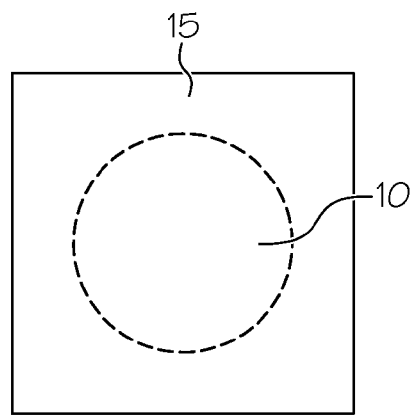

The Al-CNT composite bars can be made via powder metallurgy, and hot pressing or extrusion. They can be made of a single material or a composite structure. The composite structure can include two materials, an inner layer 10 of the bar made of the Al-CNT composite and an outer layer 15 made of pure aluminum, as shown in FIG. 2. The bars can be assembled in the cast mold. A die casting, sand casting, or other casting method can be used to cast in-place these bars along with the steel laminations. This method can also eliminate the lamination steel soldering issues often accompanying the die-casting process. Soldering is a common problem because molten aluminum sticks to steel during casting and reacts to form an intermetallic compound layer.

Carbon nanotubes (CNTs) offer significant advantages over most existing materials, including attractive mechanical properties. The in-plane graphitic C—C bonds in CNTs are one of the most stabilized chemical bonds, and make CNTs exceptionally strong and stiff against axial strains. CNTs have very high strength and toughness. The Young's modulus of single-wall carbon nanotube (SWCNT) is theoretically estimated to be as high as 5 TPa (1 T=$10^{12}$). The average value of Young's modulus of isolated multi-wall CNT (MWCNT) was measured to be 1.8 TPa, with a bending strength as high as 14.2 GPa. The tensile strength of CNTs is 100 times higher than steel, while the specific gravity is only ⅙ that of steel. In addition, CNTs have a high corrosion resistance in strong basic or acid solutions. Therefore, CNTs can be used as the reinforcing phase for strong composites. Various metal-based composites with CNTs, such as Fe-CNTs, Al-, Ni-CNTs and Cu-CNTs, have been investigated. Fabrication of aluminum-carbon nanotube composites and their electrical properties, C. L. Xu, B. Q. Wei, R. Z. Ma, J. Liang, X. K. Ma, and D. H. Wu, *Carbon, Volume* 37, *Issue* 5, 9 Apr. 1999, Pages 855-858, which is incorporated herein by reference. For example, a method of infiltrating iron with carbon nanotubes and then consolidation to provide a 45% enhancement of the yield strength of the composite containing 2.2% by volume of nanotubes relative to a similarly fabricated part of pure iron was described. A similar infiltration technique was used for aluminum parts.

There has been considerable interest in the electrical conductivity of CNTs. It has been reported that CNTs with particular combinations of N and M values, which are structural parameters indicating how much the nanotube is twisted, can be highly conducting, and can be said to be metallic. Their conductivity has been shown to be a function of their chirality (degree of twist), as well as their diameter. CNTs can be either metallic or semi-conducting in their electrical behavior. SWCNT ropes are the most conductive carbon fibers known. The achievable current density was 107 A/$cm^2$; however in theory, the SWCNT ropes should be able to sustain much higher stable current densities, as high as 1013 A/$cm^2$. Ultra-small SWCNTs have even been shown to exhibit superconductivity below 20K. (Cheap Tubes, Inc. at cheaptubes.com).

Preliminary experiments and simulation studies on the thermal properties of CNTs show very high thermal conductivity.

CNTs can be made by well-known processes, including synthesis by chemical catalytic pyrolysis of acetylene using a Co—Mg complex oxide as a catalyst. The catalyst can be prepared from Co$(NO_3)_2$ and Mg$(NO_3)_2$ by a sol-gel method. An acetylene-nitrogen mixture ($C_2H_2$:$N_2$=1:5) is introduced into the quartz chamber at a flow rate of 600 ml $min^{-1}$ at about 923 K for 30 min. The as-prepared carbon nanotubes are purified by immersing in nitric acid for about 48 hours and washing with de-ionized water. The purified CNTs are suspended in a mixture of concentrated sulfuric and nitric acids (1:3) and then sonicated at room temperature for 48 hours.

The Al-CNT composite typically can contain about 0.1 wt. % to about 5 wt. % carbon nanotubes. The CNTs, (e.g., about 0.1 to about 300 micrometer in length) and pure aluminum powder (e.g., between about 5 and about 70 micrometer) are mixed, for example, by ball milling the mixture under inert gas at about 100 to about 5000 rpm for about 10 minutes to about 10 hours, typically about 10 min. to about 2 hour. The process parameters control the uniformity and purity of the mixture. Higher speed and longer length can improve uniformity, but increase oxidation tendency. The mixtures are then hot-pressed at about 573K to about 873K under a pressure of about 15-50 MPa for more than about 10 min., typically about 10 min. to 2 hours. The hot-pressed bars are machined to size. Hot extrusion and powder metallurgy can also be used to manufacture the Al-CNT bars. In a hot extrusion process, the powders are mixed and pressed into the shape at room temperature, and then extruded at about 623K to about 873K through an extrusion die. The extrusion bar is cut into pieces and machined. In the powder metallurgy process, the powders are mixed and pressed into the shape at room temperature, and then sintered at about 673K to about 873K for about 10 minutes to about 5 hours. Hot isostatic pressing or hot pressing can be used to eliminate porosity after sintering.

In order to improve the dispersion of carbon nanotubes, a surface agent, including, but not limited to, $C_{19}H_{42}BrN$, may be added in solution. The surface agent can be absorbed significantly onto the surfaces of the CNTs, modifying the CNT dispersion. Another method to help disperse the CNTs is to mix the CNTs with nitric acid ($HNO_3$), sulfuric acid ($H_2SO_4$), ethylene glycol, or a 1:1 mixture of nitric acid and sulfuric acid via ultrasonic waves. To encapsulate the CNTs within aluminum, about 3-30 wt % CNTs is premixed with aluminum powder to form a master alloy powder for further mixing with pure Al powder to a desired composition, and ball milled under an inert gas atmosphere at about 100 to about 5000 rpm for about 30 minutes to about 10 hours.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a rotor comprising:
    providing an aluminum-carbon nanotube composite by ball milling aluminum and carbon nanotubes;
    forming a plurality of conductor bars, each comprising an inner layer of the aluminum-carbon nanotube composite surrounded by an outer layer of aluminum;
    providing a laminated steel stack having a plurality of longitudinal slots;
    placing the plurality of conductor bars in the plurality of longitudinal slots, a first and a second end of each conductor bar extending out of a longitudinal slot;
    placing the laminated steel stack with the plurality of conductor bars in a casting mold having cavities for a pair of end rings wherein the first and second ends of the plurality of conductor bars extend into the cavities; and
    filling the cavities with aluminum, aluminum alloys, or combinations thereof; and
    casting-in-place a rotor comprising the plurality of conductor bars, the laminated steel stack, and a pair of end rings.

2. The method of claim 1 wherein the ball milling takes place under an inert gas at about 100 to about 5000 rpm for a time of about 10 min to about 10 hrs.

3. The method of claim 1 wherein the conductor bars are formed by a process selected from hot pressing, hot extrusion, or powder metallurgy.

4. The method of claim 1 wherein the conductor bars are formed by hot pressing at a temperature in the range of about 573K to about 873K under a pressure of about 15 to about 50 MPa for more than about 10 min.

5. The method of claim 1 wherein the conductor bars are formed by hot extrusion at a temperature of about 623K to about 873K.

6. The method of claim 1 wherein the conductor bars are formed by sintering at a temperature of about 673K to about 873K for a time of about 10 min, to about 5 hrs.

7. The method of claim 6 further comprising pressing the sintered conductor bars using a process selected from hot pressing or hot isostatic pressing.

8. The method of claim 1, wherein the carbon nanotubes are present in the composite in an amount of about 0.1 wt % to about 5 wt %.

9. The method of claim 1 further comprising mixing the carbon nanotubes with a surface agent.

10. The method of claim 1 further comprising mixing the carbon nanotubes with nitric acid, sulfuric acid, combinations of nitric acid and sulfuric acid, or ethylene glycol.

11. The method of claim 1, wherein the casting-in-place comprises die casting, sand casting, or lost foam casting.

12. A method of making a rotor comprising:
    forming an aluminum-carbon nanotube composite by mixing aluminum, carbon nanotubes, and at least one surface agent, the carbon nanotubes being present in an amount of about 0.1 wt % to about 5 wt %;
    forming a plurality of conductor bars, each comprising the aluminum-carbon nanotube composite surrounded by aluminum;
    providing a laminated steel stack having a plurality of longitudinal slots;
    placing the plurality of conductor bars in the plurality of longitudinal slots, a first and a second end of each conductor bar extending out of a longitudinal slot;
    placing the laminated steel stack with the plurality of conductor bars in a casting mold having cavities for a pair of end rings wherein the first and second ends of the plurality of conductor bars extend into the cavities; and
    filling the cavities with aluminum, aluminum alloys, an aluminum composite, or combinations thereof; and
    casting-in-place a rotor comprising the plurality of conductor bars, the laminated steel stack, and a pair of end rings, the casting-in-place comprising die casting, sand casting, or lost foam casting.

13. The method of claim 12, wherein the mixing is by ball milling under an inert gas at about 100 to about 5000 rpm for a time of about 10 min to about 10 hrs.

14. The method of claim 12, wherein the conductor bars are formed by hot pressing at a temperature in the range of about 573K to about 873K under a pressure of about 15 to about 50 MPa for more than about 10 min.

15. The method of claim 12, wherein the conductor bars are formed by hot extrusion at a temperature of about 623K to about 873K.

16. The method of claim 12, wherein the conductor bars are formed by sintering at a temperature of about 673K to about 873K for a time of about 10 min. to about 5 hrs.

17. The method of claim 16, further comprising pressing the sintered conductor bars using a process selected from hot pressing or hot isostatic pressing.

18. A method of making a rotor comprising:
   forming an aluminum-carbon nanotube composite by ball milling aluminum and carbon nanotubes with nitric acid, sulfuric acid, combinations of nitric acid and sulfuric acid, or ethylene glycol, the carbon nanotubes being present in an amount of about 0.1 wt % to about 5 wt %;
   forming a plurality of conductor bars, each comprising the aluminum-carbon nanotube composite surrounded by aluminum;
   providing a laminated steel stack having a plurality of longitudinal slots;
   placing the plurality of conductor bars in the plurality of longitudinal slots, a first and a second end of each conductor bar extending out of a longitudinal slot;
   placing the laminated steel stack with the plurality of conductor bars in a casting mold having cavities for a pair of end rings wherein the first and second ends of the plurality of conductor bars extend into the cavities; and
   filling the cavities with aluminum, aluminum alloys, an aluminum composite, or combinations thereof; and
   casting-in-place a rotor comprising the plurality of conductor bars, the laminated steel stack, and a pair of end rings, the casting-in-place comprising die casting, sand casting, or lost foam casting.

* * * * *